(12) United States Patent
Kazakevich et al.

(10) Patent No.: US 7,660,561 B2
(45) Date of Patent: Feb. 9, 2010

(54) METHOD AND SYSTEM FOR IMPLEMENTING SMART ANTENNAS AND DIVERSITY TECHNIQUES

(75) Inventors: Leonid Kazakevich, Plainview, NY (US); Gerard Klahn, Sayville, NY (US); Fatih Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 651 days.

(21) Appl. No.: 10/769,690

(22) Filed: Jan. 22, 2004

(65) Prior Publication Data

US 2004/0156458 A1 Aug. 12, 2004

Related U.S. Application Data

(62) Division of application No. 10/328,663, filed on Dec. 23, 2002, now Pat. No. 6,714,769.

(60) Provisional application No. 60/363,051, filed on Mar. 8, 2002.

(51) Int. Cl.
*H03C 7/02* (2006.01)

(52) U.S. Cl. ............... 455/101; 465/67.11; 465/522; 465/510; 375/150; 375/347

(58) Field of Classification Search ........... 375/144, 375/147; 455/277, 276.1
See application file for complete search history.

(56) References Cited

U.S. PATENT DOCUMENTS

| | | | |
|---|---|---|---|
| 4,977,616 A * | 12/1990 | Linder et al. ............ | 455/277.2 |
| 6,137,785 A | 10/2000 | Bar-Ness | |
| 6,175,723 B1 | 1/2001 | Rothwell, III | |
| 6,434,375 B1 * | 8/2002 | Chulajata et al. ......... | 455/276.1 |
| 6,801,514 B2 | 10/2004 | Ma | |
| 2003/0016637 A1 | 1/2003 | Khayrallah et al. | |
| 2003/0027540 A1 | 2/2003 | Da Torre | |
| 2003/0031236 A1 | 2/2003 | Dahlman et al. | |
| 2003/0043887 A1 | 3/2003 | Hudson | |
| 2003/0067895 A1 | 4/2003 | Paneth et al. | |

FOREIGN PATENT DOCUMENTS

| | | |
|---|---|---|
| GB | 2 305 088 | 3/1997 |
| JP | 06-188792 | 7/1994 |

(Continued)

*Primary Examiner*—Nay A Maung
*Assistant Examiner*—Richard Chan
(74) *Attorney, Agent, or Firm*—Volpe and Koenig, P.C.

(57) ABSTRACT

Method and apparatus for transfer of signals from multiple antennas down to baseband over a common radio frequency (RF) chain. Antenna selection having greater flexibility and applicability to both uplink and downlink is obtained by giving priority to the antenna receiving a better/best quality signal. Measurements are taken by at least a channel estimator during each time slot to determine the weighting to be given to the antenna with the better/best quality signal. Techniques and apparatus are provided to take measurements over a range of intervals from time slots to single symbols, for example, to select the best signal. The techniques described herein may be used individually, and in some cases are combined to receive additional benefits in efficiency. For example, one or more of recent and/or current channel estimation, history, optimization may be employed, in addition to channel estimation, to determine signal quality.

10 Claims, 4 Drawing Sheets

FOREIGN PATENT DOCUMENTS

| | | |
|---|---|---|
| JP | 11-284555 | 10/1999 |
| JP | 2001-057526 | 2/2001 |
| JP | 2001-203527 | 7/2001 |
| TW | 465199 | 11/2001 |
| WO | 00/76162 | 12/2000 |

* cited by examiner

__US 7,660,561 B2__

METHOD AND SYSTEM FOR IMPLEMENTING SMART ANTENNAS AND DIVERSITY TECHNIQUES

CROSS REFERENCE TO RELATED APPLICATIONS

This application is a divisional application of U.S. application Ser. No. 10/328,663 filed on Dec. 23, 2002, which claims priority from U.S. provisional application No. 60/363,051 filed on Mar. 8, 2002, which are incorporated by reference as if fully set forth.

FIELD OF THE INVENTION

The present invention relates to wireless technology. More particularly, the present invention relates to the field of smart antennas and diversity techniques for improving the quality of the transmitted and/or received communication to facilitate selection of the better quality signal.

BACKGROUND

Transmitters and receivers of wireless systems typically employ a single antenna which may be preferred from a cost viewpoint. However, multiple antenna arrays have also been employed which have been found to provide certain cost/benefit features. It is nevertheless highly desirable to provide a capability of selecting the antenna receiving (or in the alternative transmitting) the signal having the best quality.

SUMMARY

The present invention is characterized by providing techniques and apparatus including a channel estimator for monitoring signals received by each antenna in a multi-antenna array to determine signal quality, and to select the better quality signal for processing. Monitoring of signal quality continues throughout the reception period in order to provide the capability of altering the selection of the signal chosen for processing whenever such a change is again warranted. Some of the techniques described herein are usable for both uplink and downlink applications.

BRIEF DESCRIPTION OF THE FIGURES

The following figures are useful in describing the techniques and apparatus embodying the principles of the present invention in which like elements are designated by like numerals and, wherein.

DETAILED DESCRIPTION AND PREFERRED EMBODIMENTS THEREOF

Figure 1:
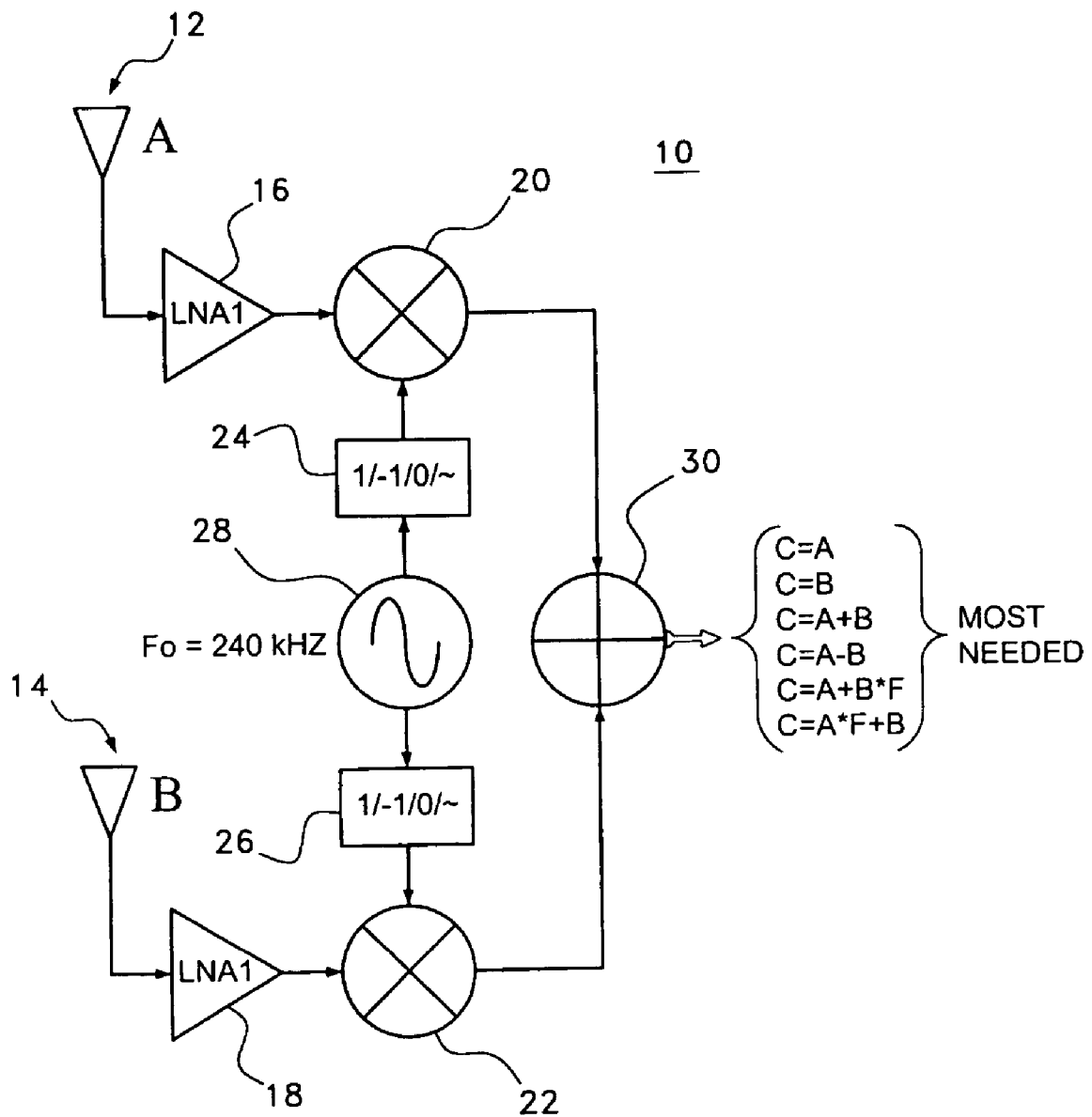
FIG. 1 is a simplified schematic showing one preferred embodiment of a multiple antenna system embodying the principles of the present invention.

FIG. 1 shows a receiver facility 10 comprised of antennas 12 and 14, each receiving an incoming RF signal from a remote transmitter, not shown. The signals received by antennas 12 and 14 are respectively amplified at 16 and 18 by linear low noise amplifiers and are then respectively delivered to mixers 20 and 22 where they are multiplied by low frequency components, which could be 0, 1, −1, or a continuous wave source with a period equal to a symbol (e.g. 240 kHz for WTDD)

In the example shown in FIG. 1, the symbol rate for a code division multiple access (CDMA) based system is 240 kHz and, after despreading the signals derived from the multiple antennas they can be separated. It should be noted that other frequencies which can achieve the same effect may be selected.

Circuits 24 and 26 respectively provide the support signals for the incoming signals and are driven by source 28 which in the example given, operates at 240 kHz. The signals from mixers 20, 22 are combined at 30 to provide the possible outputs as shown. The outputs are then sent to a single receiver for further processing.

It should be noted that the antennas employed may be similar to one another and placed at different locations or may be of different designs. The resulting signals are compared to determine their quality and selected to obtain the best quality signal. Also, more than two antennas may be employed.

Figure 2:
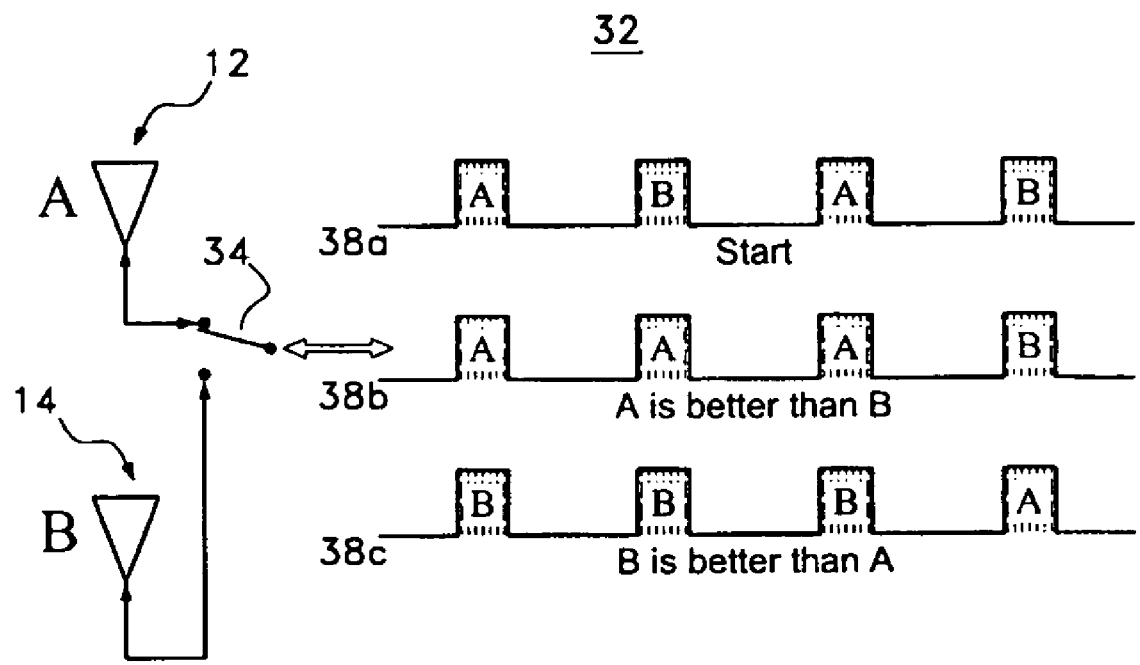
FIGS. 2 through 5 are simplified diagrams showing further alternative embodiments of the present invention.

FIG. 2 shows another alternative embodiment 32 of the present invention in which antennas A and B, which may be used either for uplink or downlink applications, are coupled through switch means 34 which may preferably be electronic switching means for coupling to the selected antenna for transmission purposes, or for coupling the selected antenna to an input of a receiver for reception purposes. In a downlink example, the receiver processes a sequence of timeslots or a sequence of frames from one antenna and another number of units from the remaining antenna(s). Although only two antennas are shown in FIG. 2, it should be understood that a greater number of antennas may be employed.

Figure 3:
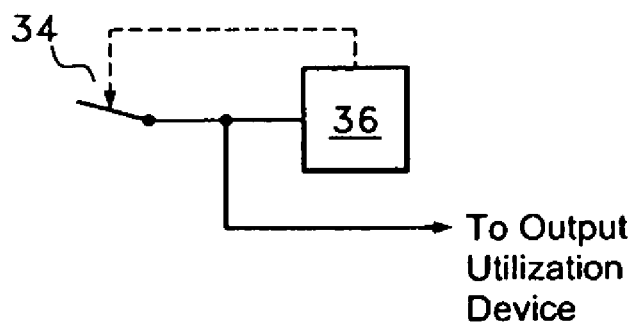

As an initial operation, the output signal is coupled to monitoring device 36, shown in FIG. 3. Assuming that the quality of the signals A and B are substantially equal, monitoring circuit 36 operates switching means 34 to alternate so that the frames or slots received are alternately transferred to the output utilization device as shown by waveform 38a. As another example, the alternating switching arrangement may be two (or more) consecutive time slots of signal A alternating with an equal number of time slots of signal B.

Assuming that the frame or slot of each of the signals A and B being examined indicate that the quality of the signal A is superior to that of the signal B, as a result, the monitoring means 36 operates switch means 34 in such a manner as to receive three units (i.e. time slots, frames, etc.) of signal A in succession and thereafter switch to antenna 14 to receive one unit of signal B, and thereafter repeating this pattern. Throughout this signal selection, the monitoring circuit 36 continues to monitor the slots/frames of each signal A and B and, in the event that there is a change in signal quality, whereupon the quality of signal B is superior to that of signal A, monitoring means 36 operates switch means 34 so as to couple a greater number of consecutive units of signal B to the output utilization device and thereafter a lesser number of consecutive units of signal A, repeating this pattern until another change in signal quality occurs between the signals A and B. Again, it should be noted that monitoring of signals A and B continues throughout the reception period (or transmission) to continually ascertain the quality of the signals A and B and to alter the weighting of the intervals per antenna coupled to the receiver.

Although the example given shows a 3-to-1 ratio of signal reception intervals favoring signal A as shown by waveform 38b or favoring signal B, shown by waveform 38c, it should be understood that other weightings may be selected and such weightings may be selected as a function of relative quality.

For example, one relative quality level may warrant a 4-to-1 ratio, a lower relative quality level may warrant a 3-to-1 ratio, a still lower quality level may warrant a 2-to-1 ratio, and so forth. The antennas 12 and 14 employed may be similar in design and distinguished merely by physical location; or may be antennas of different designs. For example, both antennas may be omni-directional, one antenna may be omni-directional and the other have a highly directional radiation pattern, and so forth. Each antenna may alternatively be an antenna array, the arrays having different directivity patterns, similar directivity patterns but with dissimilar orientations, and so forth.

The number of antennas switched may be greater in number than two. However, monitoring and comparison of the A and B signals and another signal or signals continues regardless of the priority given, whereupon a change in signal quality as between the signals monitored will cause an appropriate change in the priority. It should be noted that when signal quality as between the monitored signals is equal, an alternating pattern as shown by waveform 38*a* is obtained. Equality may be provided employing other patterns as well. For example, two intervals or frames of signal A may alternate with two intervals or frames of signal B.

The arrangement of the embodiment shown in FIGS. 2 and 3 is simple to implement and cost of implementation is minimal.

Figure 4:
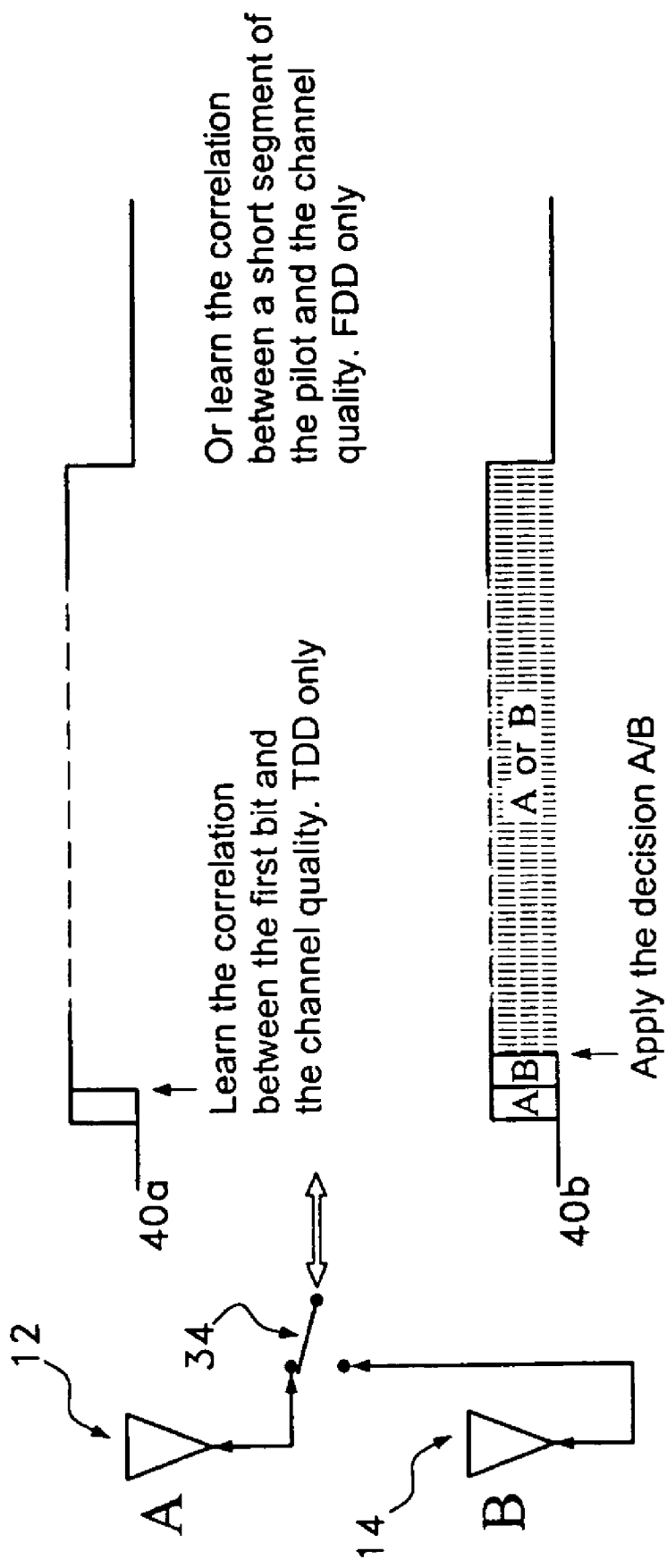

The same technique may be used for uplink application, especially for time division duplex (TDD) systems. Since uplink and downlink channels are reciprocal in TDD, once signal quality is measured at each antenna, this information is utilized to decide which antenna is given priority and in a similar fashion to that of the reception application, a transmitter transmits multiple units from one antenna and another different number of units from the other antenna based on comparison of their signal qualities. The transmitter facility may provide a pilot signal to remote receivers, over each antenna FIG. 4 shows another alternative embodiment of the present invention and a modification of that shown in FIG. 2. In the embodiment 32 of FIG. 2, measurements are made over the whole time slot, and a decision based on these measurements is utilized in the next subsequent time slot or frame. To significantly reduce the delay in initiating priority of the compared signals, the embodiment 32' shown in FIG. 3 performs measurements at the beginning of a time slot or frame by examining only one or a few symbols. To accomplish this, the receiver learns the correlation between measured quality in a first bit or symbol or several bits or symbols and the rest of the time slot or frame. This is accomplished, for example, by calculating and storing in a memory the energy per symbol of the first symbol(s) to compare this with the energy per symbol of the remainder of the time slot, and the block error of the time slot and building a correlation model, which will be used for the real time measurements. The technique of FIG. 4 is preferable to the technique shown in FIG. 2 when faster changing channels are encountered.

In TDD applications, the correlation between the first bit(s) energy and channel quality is determined, shown by waveform 40*a*. (In case of frequency division duplex applications, the monitoring device learns the correlation between a short segment of the pilot energy or other parameters and the channel quality). As shown by waveform 40*b*, one or two symbols of signal A are analyzed followed by an analysis of one or two symbols of signal B and, immediately thereafter, the remainder of the time slot or frame is derived from the selected antenna 12 or 14 in accordance with the quality levels of the signals A and B.

The first one or two signals utilized for quality measurements and comparisons may be reconstructed through the utilization of error correcting codes or the like.

Figure 5:
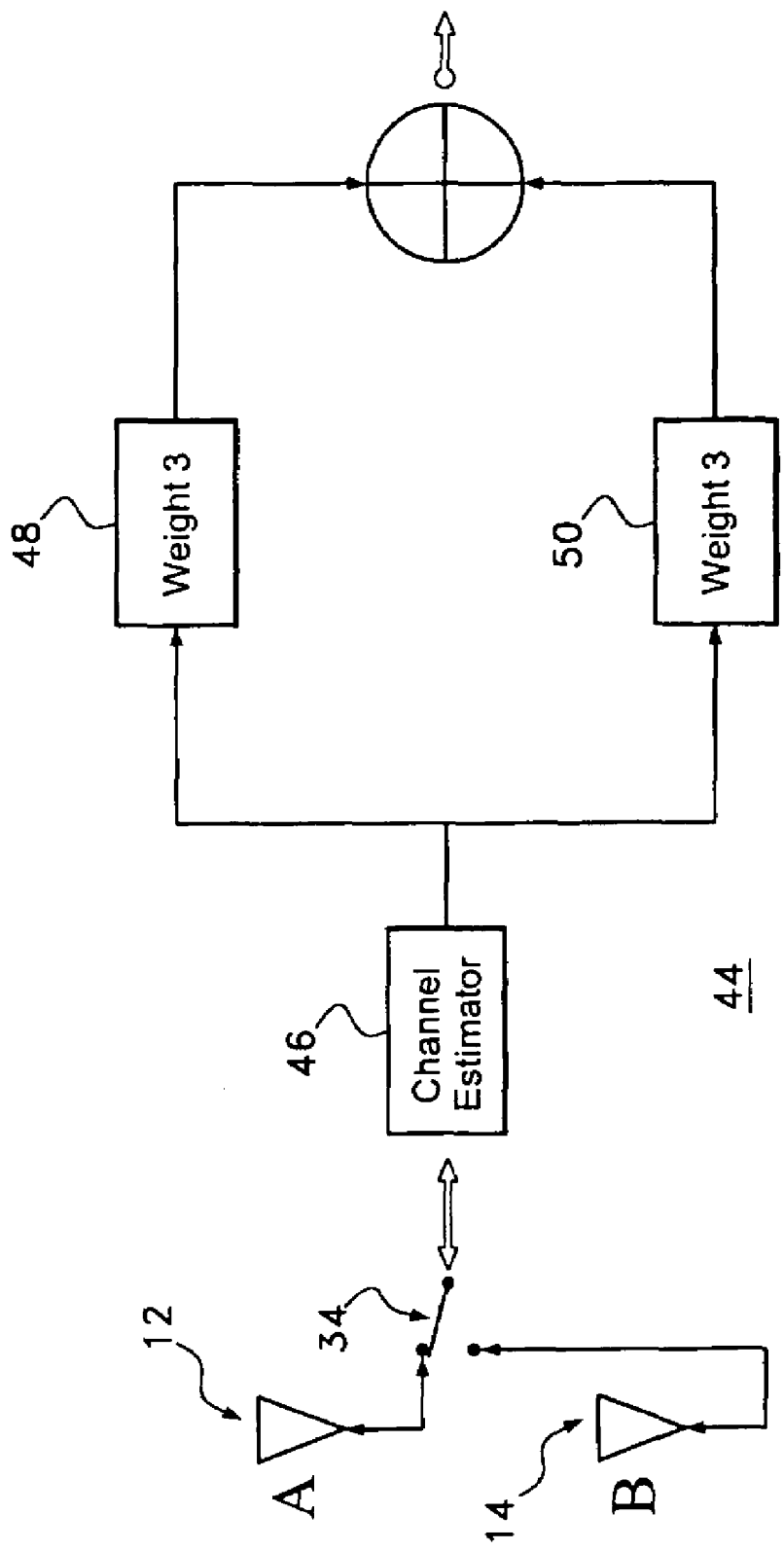

FIG. 5 shows still another embodiment of the present invention in which techniques of the previous embodiments are combined to reap the benefits of each technique as channel conditions warrant. Although the technique necessitates a greater amount of processing, more optimal solutions are available.

In the embodiment 44 shown in FIG. 5, channel estimator 46 estimates channel response and changes the weights of the algorithms of 48 and 50 (block 48 deploys the algorithm 32 and block 50 uses algorithm 32') depending upon the channel properties (e.g. for fast changing channels 32' will be used more often, for slow changing channels 32 will be used more often).

In still another embodiment of the present invention, in third generation (3G) systems of the TDD and FDD types, there is a need for single quality measurements in order to make decisions regarding various processes. In the present invention, one example is a selection of a signal from one of the antennas to process for receive and transmit diversity. The desired measurement is typically related to signal-to-noise ratio which may be inferred from signal measurements. The present concept provides the ability to make decisions based on noise level when nothing else is known about the signal. As one example, broadband signal level is measured from the multiple antennas to decide among the antennas, such as antennas 12, 14 of FIG. 1, which one has the stronger signal. In the event that there is no way to know if the signal measured is due to desired signal or interference, the noise energy in a guard period is measured and then the energy per bit is measured for each antenna in order to select the antenna with the highest energy per bit to the noise energy ratio in order to select the antenna with the highest signal to noise ratio. Thus, the guard period (no signal) received by each antenna A and B is alternately measured in order to give priority to the desired signal. As another alternative, measurements may be performed during the intervals between the transmission of data signals, and analyzing in order to determine which signal to give priority. The priority may then be weighted in the matter described here and above such as the example shown in FIG. 2.

What is claimed is:

1. Apparatus for processing a communication received by at least two (2) antenna assemblies, said communication being comprised of sequentially transmitted slots of equal length, said apparatus comprising:
    a channel estimator;
    first and second units coupled to the channel estimator for determining signal quality based on at least one of history, recent channel estimation and optimization;
    a switch responsive to the signal quality that selectively couples slots from said antenna assemblies to a common input of said channel estimator, wherein the slots from each antenna assembly are coupled to said common input in a uniform sequence responsive to a first quality output, wherein said switch couples outputs of the antenna assemblies to said common unit in a non-uniform sequence responsive to a second quality output different from said first quality output;
    wherein switching in said non-uniform sequence comprises forwarding at least two consecutive slots of one of said two antenna assemblies to said common input before forwarding a single slot from the other of said two antenna assemblies.

2. The apparatus of claim 1 wherein signal quality outputs of said first and second units are combined.

3. The apparatus of claim 1 comprising:
   wherein the communications received by each antenna assembly is coupled to said channel estimator.

4. Apparatus for processing a communication received by at least two (2) antenna assemblies, said communication being comprised of sequentially transmitted slots of equal length, said apparatus comprising:
   a channel estimator;
   switch means for selectively coupling slots from said antenna assemblies to a common input of said channel estimator in a given pattern;
   first and second units coupled to said channel estimator for determining signal quality based on at least one of history, recent channel estimation and optimization;
   a switch responsive to the signal quality that selectively couples slots from said antenna assemblies to a common input of said channel estimator, wherein the slots from each antenna assembly are coupled to said common input in a uniform sequence responsive to a first quality output, wherein said switch couples outputs of the antenna assemblies to said common unit in a non-uniform sequence responsive to a second quality output different from said first quality output;
   wherein switching in said non-uniform sequence comprises forwarding at least two consecutive slots of one of said two antenna assemblies to said common input before forwarding a single slot from the other of said two antenna assemblies.

5. The apparatus of claim 4 wherein said switching means alters said given pattern responsive to a signal quality value.

6. A method for selectively coupling a communication received by at least two (2) antenna assemblies to a channel estimator, said communication being comprised of sequentially transmitted slots of equal length, comprising:
   said channel estimator:
      estimating channel response; and
      a switch:
         controlling the switching of the communication of said two (2) antenna assemblies responsive to said channel response;
   wherein switching in said non-uniform sequence comprises forwarding at least two consecutive slots of one of said two (2) antenna assemblies to said common input before forwarding a single slot from the other of said two (2) antenna assemblies.

7. The method of claim 6 wherein first and second quality outputs are generated responsive to said channel response and at least one of history, recent channel estimation and optimization; and
   combine said quality outputs.

8. The method of claim 7 wherein the combined output provides a signal quality output.

9. The method of claim 6 further comprising:
   said switch:
      selectively coupling slots from said antenna assemblies to said channel estimator in a uniform sequence responsive to a first quality output.

10. The method of claim 9 wherein said switch:
    selectively couples outputs of the two antenna assemblies in a non-uniform sequence responsive to a second quality output different from said first quality output.

* * * * *

UNITED STATES PATENT AND TRADEMARK OFFICE
CERTIFICATE OF CORRECTION

PATENT NO. : 7,660,561 B2  Page 1 of 1
APPLICATION NO. : 10/769690
DATED : February 9, 2010
INVENTOR(S) : Kazakevich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1785 days.

Signed and Sealed this

Thirtieth Day of November, 2010

David J. Kappos
*Director of the United States Patent and Trademark Office*